Dec. 14, 1965 W. G. HESPENHEIDE 3,223,983
RETENTIVE DATA STORE AND MATERIAL
Filed Sept. 25, 1958

*INVENTOR.*
WILBUR G. HESPENHEIDE
*BY*
ATTORNEY 3,223,983
Patented Dec. 14, 1965

3,223,983

RETENTIVE DATA STORE AND MATERIAL

Wilbur G. Hespenheide, Malvern, Pa., assignor to Burroughs Corporation, Detroit, Mich., a corporation of Michigan Filed Sept. 25, 1958, Ser. No. 763,269
11 Claims. (Cl. 340—174)

It is well known to store data in binary form by magnetizing all or portions of a piece of ferromagnetic material, having a preferred axis of magnetization, in a first direction along such axis to represent a first value of a digit, or in a second direction along such axis to represent a second value of the digit. The most common manner of recovering the value thus stored is to apply to the appropriate portion of material a magnetizing field sufficient to saturate the material in the first direction, and to determine, usually by observing the voltage induced in conductors near the material, whether it undergoes a reversal of magnetization from remanence in the second direction to saturation in the first direction, or whether it simply suffers the slight change from remanence in the first direction to saturation in the first direction. This method of determining the immediately previous state of the material destroys the stored information, in that the material is always left in the first state, and therefore this general method is known as "destructive readout." Non-destructive readout schemes have been described which variously apply to toroidal cores of metallic tape, or to more complex magnetic circuits comprising a number of apertures. For compactness and economy, it is desirable to employ simple forms of magnetic material, such as wires, which can be used to store a number of information values in a single piece of such material. Since destructive readout frequently necessitates the provision of apparatus means to record again, or regenerate, data once read out which it is desired to preserve in storage, it is particularly desirable to provide non-destructive readout of data recorded in magnetic material in the form of wires or rods; for the advantages of compactness and economy are partly dissipated if it is necessary to provide additional apparatus to utilize the materials in the wire or rod forms.

In a copending application, which is assigned to the assignee of this application, entitled "Magnetic Material and Data Store," Serial No. 763,241, filed September 25, 1958, I teach the electrodeposition of ferromagnetic materials having a direction of easy or preferred magnetization which is determined by the application, during deposition, of a magnetizing field oriented in the direction desired for the direction of preferred magnetization. In particular, I teach the production upon a central conductor of a ferromagnetic coating which possesses a preferred direction helical about the axis of the central conductor. This is achieved by the application, during deposition, of a magnetizing field component along the axis of the central conductor (which may be produced by a current-carrying solenoid surrounding the central conductor and having its axis parallel to the central conductor); and by the simultaneous application of a magnetizing field component circular about the central conductor, which component is produced by the passage through the central conductor of a current additional to the electrodeposition current. Such a process lends itself well to a continuous procedure in which a central conductor of wire is plated while in motion through an electrolytic bath surrounded by a solenoid which produces a magnetizing field component parallel to the central axis of the conductor; and sliding contacts to the wire are used both to convey the electroplating current and to convey an additional magnetizing current which passes through the wire from one sliding contact to another on the other side of the plating region. I do in fact teach such a process in detail in the application cited supra; and such a process is valuable for producing a central conductor coated with a ferromagnetic material having a preferred direction of magnetization (hereinafter to be referred to simply as "preferred axis") helical about the central axis of the central conductor. In the course of further investigations of the electrodeposition of magnetic materials having controlled preferred axes, I discovered a combination of conditions of electrodeposition which produce a material having the novel property that, while its direction of magnetization may be altered by some conventional means, other conventional means of producing flux changes to read out the stored data do indeed produce significant flux changes, but do not destroy the stored data.

My invention comprises a binary data storage device employing wires coated with such deposited ferromagnetic material, according to detailed specification hereinafter, at various portions of which conductors are provided in proximity, so that by passage of current of suitable magnitude and direction through given conductors, the ferromagnetic material in the vicinity of such conductors may be magnetized in one of two given directions or senses, according to the direction of the magnetizing current. Passage of current through the wire will then induce a voltage in the given conductors, through non-destructive magnetic changes produced in the ferromagnetic material. It is an advantage of my invention that the polarity of the voltage thus induced depends upon the direction of magnetization of the ferromagnetic material, but is independent of the direction of the current through the wire. Since current through the wire is required only for reading out, it facilitates design that its direction is immaterial, in that such current may be provided, for example, by a transformer without inconvenience from the so-called direct-current restoration problem.

One object of my invention is to provide materials for and a data storage device in which large numbers of units of binary information may be stored in a single piece of magnetic material, and read out non-destructively.

Another object of my invention is to provide a data storage device in which large numbers of units of binary information may be stored in a single piece of magnetic material, and read out by currents whose polarity does not affect the polarity significance of the signals read out.

Other objects and advantages of my invention will appear in the specification and description following hereinafter.

For the better explanation of my invention, I provide attached drawings, as follows.

Figure 1:
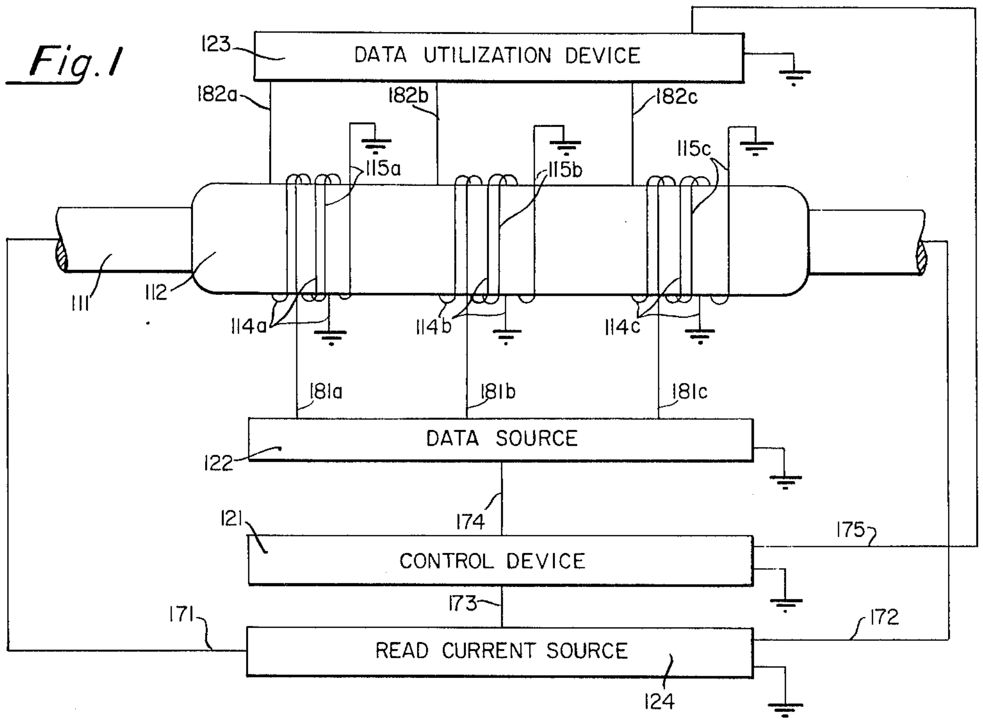
FIGURE 1 represents one embodiment of my invention for use as a data storage device.

In FIGURE 1, central conductor 111 is preferably a tungsten wire 6 mils in diameter. Ferromagnetic coating 112 is a nickel-iron alloy deposited upon central conductor 111 under the following conditions. The wire 111 is drawn continuously, at a rate of about 20 inches per minute, through an immersion path 8 inches long in a suitable electrolytic cell containing, at a temperature of 150 degrees Fahrenheit, a bath composed of iron and nickel sulfamates in water solution in concentration of 15 grams per liter of iron as ferrous ion and 77 grams per liter of nickel as nickelous ion, the pH being adjusted by addition of sulfamic acid to a value of 1.5. A solenoid external to the electrolytic bath produces a magnetizing field component of 121 oersteds parallel to the axis of conductor 111. A plating current of 600 milliamperes is applied to the wire 111 from a nickel wire anode, the current entering wire 111 from the electrolyte at various points in the bath and passing out in the direction of motion of the wire 111 through the electrolyte. An additional 600 milliamperes of current is caused to flow through the wire in the direction of its motion through the bath, so that there is a current of 600 milliamperes flowing through the wire at its point of entrance into the bath and the sum of 600 plus 600 or 1200 milliamperes flowing in the wire at the point of its exit from the bath. Electroplating under these preferred conditions produces a nickel-iron alloy which has the peculiar and novel property of giving so-called non-destructive readouts when used as part of a data store.

Solenoids **114*a*, 114*b*, and 114*c* are wound at separate points along the length of conductor 111. Solenoids 115*a*, 115*b*, and 115*c* are wound in close proximity, respectively, to solenoids 114*a*, 114*b*, and 114*c*. All solenoid windings are insulated, although each has an end connected to ground, as indicated by conventional symbols. Since the possible means of utilizing data storage devices are very numerous, according to the known art, and since it is common in the computer and data-processing art to employ given circuit elements for a variety of different functions at different times, the basic elements to perform given functions are here indicated by blocks, and their requisite functions will be specified. In the construction of a particular device employing my invention, the circuit elements actually performing such functions may be dispersed throughout such a device in such fashion that they can be identified only by their contribution to performing the specified function. Control device 121 is a source of signals, properly timed and sequenced to cause items 122, 123, and 124 to function as herein described. Initially a given signal from control source 121 by line 174 to data source 122 causes data source 122 to apply to solenoid 115*a* via line 181*a* a pulse of current of polarity suitable to magnetize the portion of coating 112 in the vicinity of solenoid 115*a* in a first direction to store a first value of data, or in a second direction to store a second value of data. If, for example, a current pulse of conventional sign flows from data source 122 by line 181*a* through solenoid 115*a* to ground and thence through ground to data source 122, completing the circuit, then coating 112 in the vicinity of solenoid 115*a* will be magnetized in such manner as to produce a north magnetic pole to the left of solenoid 115*a*. A reversed direction of current pulse would produce a north magnetic pole to the right of solenoid 115*a*. It is a specified property of data utilization device 123, that, except when it is caused to function by a signal along line 175 from control device 121, it is insensitive to induced voltages appearing on lines 182*a*, 182*b*, and 182*c*, and presents a high impedance to such voltages. Thus the recording process here described does not affect data utilization device 123 at the time of recording, despite the close coupling between solenoids 114*a* and 115*a*, 114*b* and 115*b*, and 114*c* and 115*c***.

Figure 2:
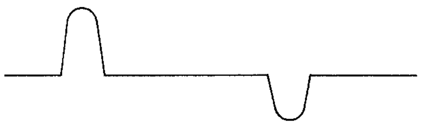
FIGURES 2 and 3 represent typical output voltage waveforms produced by the operation of my invention for a first polarity of recorded signal.
Figure 3:
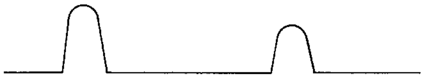
Figure 4:
FIGURES 4 and 5 represent typical output voltage waveforms produced by the operation of my invention for a second polarity of recorded signal.
Figure 5:
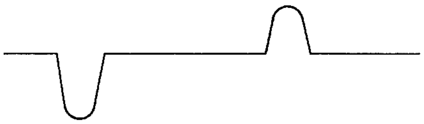

Because solenoids **115*a*, 115*b*, and 115*c*, are sufficiently separated, it is possible for the portion of coating 112 respectively adjacent to each solenoid to be magnetized independently in one of the two directions along its direction of easy magnetization. Thus, for example, current pulses to solenoids 115*a* and 115*b* may be opposite in polarity in which case a magnetic pole will exist in coating 112 between solenoids 115*a* and 115*b*, and return flux will pass through the space external to coating 112. Likewise, a magnetic pole may exist between solenoids 115*b* and 115*c*. In any event, in the embodiment represented, three portions of coating 112 may each be placed in either of two remanent states, by current pulses from data source 122. It is apparent that the application of such current pulses may be either simultaneous, or non-simultaneous. At such time as the desired function of the data utilization device 123 may require, control device 121 sends a signal by line 175 to data utilization device 123 which causes it to become responsive to voltages appearing on lines 182*a*, 182*b*, and 182*c*. At the same or nearly the same time, control devices 121 sends a signal by line 173 to read current source 124 which causes it to apply a current pulse through line 171 through conductor 111 and through line 172 back to read current source 124, completing the circuit, or alternatively the current pulse passes by line 172, conductor 111 and line 171 back to its source. The polarity of the so-called "read current" does not affect the polarity of the voltage induced in the solenoids 114*a*, 114*b*, 114*c*, by the application of such read current. The polarity of the induced voltage does, however, depend upon the direction of remanent magnetization of the portion of coating 112 adjacent to the solenoid. FIGURE 2 represents the voltage induced in a solenoid (such as 114*a*) for a first polarity of magnetic remanence in the adjacent coating 112, for a given polarity of read current. FIGURE 3 represents the voltage induced in a solenoid (such as 114*a*) for the same first polarity of magnetic remanence in the adjacent coating 112, but for a polarity of read current reversed from that used in FIGURE 2. FIGURE 4 represents the voltage induced for a second polarity of magnetic remanence from that postulated in FIGURES 2 and 3, but with the same polarity of read current as is assumed for FIGURE 2. FIGURE 5 represents the voltage induced for a second polarity of magnetic remanence, as in FIGURE 4, but for a reversed polarity of read current, the same polarity as assumed for FIGURE 3. It will be observed that the voltage induced at the end of the read current pulse is not independent of the polarity of the read current pulse. Any ambiguity from this may be eliminated by requiring that the data utilization device 123 shall be rendered unresponsive to voltages induced during the decay of the read current pulse. This may be achieved by many devices known in the art; one simple means for the embodiment represented in FIG. 1 is to time the control signals from control device 121 to data utilization device 123 and read current source 124 so that the read current pulse does not decay until the signal over line 175 to the data utilization device 123 has been terminated and data utilization device 123 has become unresponsive to signals on lines 182*a*, 182*b*, and 182*c***.

It is an experimental fact that the method here described for reading, by application of current pulses to conductor 111, the remanent state of the different portions of ferromagnetic coating 112, does not destroy that remanent state. Thus, the data stored in coating 112 may be read again and again for utilization by the data utilization device 123, and will not change until different data are impressed by operation of data source 122.

It is apparent that the use of central conductors plated with nickel-iron alloy having the peculiar non-destructive readability herein disclosed may take many forms according to well-known computer art, and such variations are implicitly taught by my present disclosure and comprehended in it.

What is claimed is:

1. A storage device comprising a central conductor coated with a ferromagnetic material having an axis of preferred magnetization helical about the axis of said central conductor, means for producing a first magnetizing field parallel to the axis of said central conductor whereby said ferromagnetic coating is magnetized in either of two directions along said axis of preferred magnetization, means including a source of current controlled to provide nondestructive interrogation of said device and adapted for pulsing said central conductor, the flow of current through said central conductor producing a second magnetizing field which disturbs but does not reverse the direction of magnetization established in the coating of said central conductor by said first magnetizing field.

2. A storage device as defined in claim 1 wherein said ferromagnetic material consists of a ferromagnetic nickel-iron alloy.

3. A storage device as defined in claim 1 wherein said means for establishing a first magnetizing field comprise at least one electrically energizable winding encompassing said coated central conductor.

4. A storage device as defined in claim 1 including winding means for sensing the disturbance of said direction of magnetization of said ferromagnetic coating by said second magnetizing field, the polarity of the voltage initially induced in said winding means by said disturbance being a function of the direction of magnetization established in said ferromagnetic coating by said first magnetizing field and being independent of the direction of current flow through said central conductor and the resulting direction of said second magnetizing field.

5. A data storage device comprising an electrodeposited cylinder of ferromagnetic material having an axis of preferred magnetization helical about the axis of said cylinder, means for producing a first magnetizing field parallel to the axis of said cylinder whereby said ferromagnetic material is magnetized in either of two directions along said axis of preferred magnetization, means for producing a second magnetizing field orthogonal to the direction of said first magnetizing field and having a net magnetomotive force along a closed path around said cylinder, said second magnetizing field being of controlled intensity so as to disturb but not reverse the direction of magnetization established in said ferromagnetic material by said first magnetizing field.

6. A data storage device as defined in claim 5 wherein said electrodeposited ferromagnetic material consists of a ferromagnetic nickel-iron alloy.

7. A data storage device comprising a central conductor coated with a ferromagnetic material having an axis of preferred magnetization helical about the axis of said central conductor, first winding means inductively coupled to said ferromagnetic coating, means including a source of current for pulsing said first winding means, the flow of current through said first winding means producing a first magnetizing field parallel to the axis of said central conductor whereby at least a portion of said ferromagnetic coating is magnetized in either of two directions along said axis of preferred magnetization, means including a source of current controlled to provide nondestructive interrogation of said device and adapted for pulsing said central conductor, the flow of current through said central conductor producing a second magnetizing field which disturbs but does not reverse the direction of magnetization established in said portion of ferromagnetic coating by said first magnetizing field, second winding means inductively coupled to said ferromagnetic coating, the disturbance of the direction of magnetization in said portion of ferromagnetic coating of said central conductor by said second magnetizing field inducing a voltage in said second winding means, the polarity of the voltage pulse initially induced in said second winding means being indicative of the direction of magnetization established in said portion of ferromagnetic coating by said first magnetizing field and being independent of the direction of the current flow through said central conductor and the resulting direction of said second magnetizing field.

8. A storage device as defined in claim 7 wherein said ferromagnetic material consists of a ferromagnetic nickel-iron alloy.

9. A data storage device comprising a central conductor coated with a ferromagnetic material having an axis of preferred magnetization helical about the axis of said central conductor, said central conductor being coated with said ferromagnetic material by immersion in a plating bath consisting of an aqueous solution of iron sulfamate and nickel sulfamate containing approximately 15 grams per liter of iron as ferrous ion and approximately 77 grams per liter of nickel as nickelous ion and in addition sufficient sulfamic acid to produce a pH of approximately 1.5, at a temperature of 150° Fahrenheit and being effected by plating current flow for depositing nickel and iron ions on the surface of said conductor, the helically oriented axis of preferred magnetization of said ferromagnetic material resulting from the application of suitable magnetizing fields to said material in the presence of said plating current, first winding means inductively coupled to said ferromagnetic material, means including a source of current for pulsing said first winding means, the flow of current through said first winding means producing a first magnetizing field parallel to the axis of said central conductor whereby at least a portion of said ferromagnetic material is magnetized in either of two directions along said axis of preferred magnetization, means including a source of current for pulsing said central conductor, the flow of current through said central conductor producing a second magnetizing field which disturbs but does not reverse the direction of magnetization established in said portion of ferromagnetic material by said first magnetizing field.

10. The process of electrodepositing upon a central conductor a ferromagnetic coating having a preferred direction of magnetization helical about the said central conductor, comprising: immersing a portion of tungsten wire 8 inches in length and 6 thousandths of an inch in diameter in a plating bath consisting of an aqueous solution of iron sulfamate and nickel sulfamate containing approximately 15 grams per liter of nickel as nickelous ion and in addition sufficient sulfamic acid to produce a pH of approximately 1.5, at a temperature of 150° Fahrenheit; surrounding the said central tungsten wire conductor with a solenoidal winding whose central axis is substantially coincident with the immersed portion of the said central conductor, and passing through said solenoidal winding a continuous current sufficient to produce in the vicinity of the said central conductor a magnetizing field component of 121 oersteds; passing along the length of the said central conductor a continuous electric current of the value of 6 hundred milliamperes; passing from the said bath into the said tungsten wire electric current of the value of 6 hundred milliamperes to reduce nickel and iron ions upon the surface of the said wire; and withdrawing plated wire from the bath and thereby feeding unplated wire into the bath at a lineal speed of approximately 20 inches per minute, the said plated wire product exhibiting in its coating ferromagnetic properties including a preferred axis of magnetization substantially helical about the said central conductor.

11. The process of forming a data storage device capable of nondestructive read-out when interrogated by a controlled current pulse applied along the axial length of said device and providing output voltage signals in solenoids positioned along said length, including the following steps for coating a central conductor with ferromagnetic material and establishing in said material a preferred axis of magnetization substantially helical about said conductor: immersing a portion of tungsten wire 8 inches in length and 6 thousandths of an inch in diameter in a plating bath consisting of an aqueous solution of iron sulfamate and nickel sulfamate containing approximately 15 grams per liter of nickel as nickelous ion and in addition sufficient sulfamic acid to produce a pH of approximately 1.5, at a temperature of 150° Fahrenheit; surrounding the said central tungsten wire conductor with a solenoidal winding whose central axis is substantially coincident with the immersed portion of the said central conductor, and passing through said solenoidal winding a continuous current sufficient to produce in the vicinity of the said central conductor a magnetizing field component of 121 oersteds; passing along the length of the said central conductor a continuous electric current of the value of 6 hundred milliamperes; passing from the said bath into the said tungsten wire electric current of the value of 6 hundred milliamperes to reduce nickel and iron ions upon the surface of the said wire; and withdrawing plated wire from the path and thereby feeding unplated wire into the bath at a lineal speed of approximately 20 inches per minute.

References Cited by the Examiner

UNITED STATES PATENTS

| | | | |
|---|---|---|---|
| 2,676,392 | 4/1957 | Buhrendorf | 29—155.58 |
| 2,877,540 | 3/1959 | Austen | 29—155.5 |
| 3,069,661 | 12/1962 | Gianola | 340—174 |
| 3,083,353 | 3/1963 | Bobeck | 340—174 |

FOREIGN PATENTS

| | | |
|---|---|---|
| 1,190,683 | 4/1959 | France. |

OTHER REFERENCES

Pages 1319–1340, November 1957, Publication II: "A New Storage Element Suitable for Large-Sized Memory Arrays—The Twistor" by A. H. Bobeck in "The Bell System Technical Journal."

Pages 822–830, January 1954, Publication III: "Nondestructive Magnetic Cores" by D. A. Buck and W. I. Frank in "Communications and Electronics."

Pages 1283–1288, August 1954, Publication IV: "The Nondestructive Read-Out of Magnetic Cores," by A. Papoulis in "Proceedings of the IRE."

Pages 120–123, December 10–12, 1956, Publication VI: "A Compact Coincident-Current Memory" by Pohm and Rubens in Proc. of East Joint Comp. Conf.

Pages 288–289, March 1958, Publication VII: "Reversible Rotation in Magnetic Films" by Sanders & Rossing, Journal of App. Physics, vol. 29, No. 3.

IRVING L. SRAGOW, *Primary Examiner.*

Disclaimer 3,223,983.—*Wilbur G. Hespenheide*, Malvern, Pa. RETENTIVE DATA STORE AND MATERIAL. Patent dated Dec. 14, 1965. Disclaimer filed Aug. 9, 1971, by the assignee, *Burroughs Corporation*.

Hereby enters this disclaimer to claims 10 and 11 of said patent.

[*Official Gazette November 23, 1971.*]